United States Patent
Izumi et al.

(10) Patent No.: US 11,791,747 B2
(45) Date of Patent: Oct. 17, 2023

(54) ELECTRIC POWER SUPPLY SYSTEM

(71) Applicant: TOYOTA JIDOSHA KABUSHIKI KAISHA, Toyota (JP)

(72) Inventors: Junta Izumi, Nagoya (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/833,191

(22) Filed: Jun. 6, 2022

(65) Prior Publication Data

US 2023/0056441 A1  Feb. 23, 2023

(30) Foreign Application Priority Data

Aug. 18, 2021 (JP) .................. 2021-133402

(51) Int. Cl.
*H02M 7/539* (2006.01)
*H02J 7/00* (2006.01)
(Continued)

(52) U.S. Cl.
CPC ............... *H02M 7/539* (2013.01); *H02J 3/32* (2013.01); *H02J 7/0013* (2013.01);
(Continued)

(58) Field of Classification Search
CPC ............. H01M 10/482; H01M 10/441; H01M 2010/4271; H01M 10/425; Y04S 20/222; Y04S 20/221; Y04S 10/14; Y04S 50/10; Y04S 50/16; H02J 2207/20; H02J 3/32; H02J 7/0013; H02J 7/0016; H02J 7/007; H02J 7/0021; H02J 7/0024; H02J 7/005; H02J 7/0047; H02J 7/0063; H02J 3/14; H02J 7/00712; H02J 7/007194; H02J 7/34; H02J 7/342; H02J 7/0025; Y02E 60/10;
(Continued)

(56) References Cited

U.S. PATENT DOCUMENTS

| 11,424,620 | B2 * | 8/2022 | Juang ................. H02J 7/007 |
| 2011/0254373 | A1 * | 10/2011 | Johnson ............. H02M 7/483 307/77 |
| 2019/0103750 | A1 * | 4/2019 | Kristensen ........... H02J 7/0016 |

FOREIGN PATENT DOCUMENTS

| BE | 1022874 B1 * | 9/2016 |
| JP | 2018-074709 A | 5/2018 |

(Continued)

*Primary Examiner* — Ryan Johnson
(74) *Attorney, Agent, or Firm* — Oliff PLC

(57) ABSTRACT

An electric power supply system includes an alternating current electric power supply circuit that converts direct current electric power of a first direct current sweep unit including a battery string into alternating current electric power using a first inverter and outputs it, and an alternating current sweep unit that includes a U-phase battery string, a V-phase battery string, and a W-phase battery string that are Y-connected. Output densities of batteries of the battery string are higher than output densities of batteries of the alternating current sweep unit. Alternating current electric power is output from the alternating current sweep unit and the alternating current electric power supply circuit, and after a predetermined period elapses, the output of the alternating current electric power from the alternating current electric power supply circuit is stopped.

5 Claims, 8 Drawing Sheets

(51) Int. Cl.
*H02J 7/34* (2006.01)
*H02J 3/32* (2006.01)

(52) U.S. Cl.
CPC ........ *H02J 7/0016* (2013.01); *H02J 7/00712* (2020.01); *H02J 7/007194* (2020.01); *H02J 7/342* (2020.01); *Y02E 60/10* (2013.01)

(58) Field of Classification Search
CPC ................ G01R 31/392; G01R 31/396; Y02B 70/3225; H02M 7/483
See application file for complete search history.

(56) References Cited

FOREIGN PATENT DOCUMENTS

KR       20160028341 A  *  3/2016
WO      2018/079664 A1    5/2018

\* cited by examiner

<DRIVEN STATE>

<DELAY PERIOD>

<STOP PERIOD>

ELECTRIC POWER SUPPLY SYSTEM

CROSS-REFERENCE TO RELATED APPLICATION

This application claims priority to Japanese Patent Application No. 2021-133402 filed on Aug. 18, 2021, incorporated herein by reference in its entirety.

BACKGROUND

1. Technical Field

The present disclosure relates to an electric power supply system, in particular, to an electric power supply system using a plurality of battery strings.

2. Description of Related Art

Japanese Unexamined Patent Application Publication No. 2018-074709 (JP 2018-074709 A) discloses a control circuit used for controlling a battery string. The battery string includes a plurality of battery circuit modules connected to each other. Each battery circuit module included in the battery string includes a battery, a first switch connected in parallel to the battery, a second switch connected in series to the battery, and a first output terminal and a second output terminal to which the voltage of the battery is applied when the first switch is in an OFF state and the second switch is in an ON state. The control circuit can adjust the output voltage of the battery string to a desired magnitude by controlling the first switch and the second switch of each battery circuit module included in the battery string.

SUMMARY

JP 2018-074709 A discloses an electric power supply system that outputs direct current electric power using a battery string as described above. However, in JP 2018-074709 A, no study has been conducted on an electric power supply system that outputs alternating current electric power using a battery string. When an electric power supply system that outputs alternating current electric power using a battery string can be implemented, the range of applications for the battery string can be expanded, and the cost of the battery string can be expected to be reduced.

The present disclosure provides an electric power supply system that outputs alternating current electric power using a battery string.

An electric power supply system according to an aspect of the present disclosure includes an alternating current sweep unit configured to output alternating current electric power from a U-phase battery string, a V-phase battery string, and a W-phase battery string that are Y-connected, an alternating current electric power supply circuit configured to convert an output of a direct current sweep unit including a direct current battery string into alternating current electric power using an inverter and output the alternating current electric power, a control device configured to control the alternating current sweep unit and the alternating current electric power supply circuit. Each of the U-phase battery string, the V-phase battery string, the W-phase battery string, and the direct current battery string includes a plurality of battery circuit modules connected in series. Each of the battery circuit modules includes a battery, an output terminal that outputs voltage of the battery, a first switch connected to the output terminal and connected in parallel to the battery, and a second switch connected in series to the battery. Each of the battery circuit modules is configured such that the voltage of the battery is applied to the output terminal when the first switch is in an OFF state and the second switch is in an ON state. The output densities of the batteries included in the direct current battery string are higher than the output densities of the batteries included in the U-phase battery string, the V-phase battery string, and the W-phase battery string. The alternating current electric power supply circuit and the alternating current sweep unit are electrically connectable to an external electric power supply. The control device is configured to control the alternating current sweep unit and the alternating current electric power supply circuit such that electric power adjustment of the external electric power supply is performed by input and output electric power of the alternating current sweep unit and the alternating current electric power supply circuit. The control device is configured to control the alternating current sweep unit and the alternating current electric power supply circuit such that when an output of alternating current electric power is requested for the electric power adjustment, alternating current electric power is output from the alternating current sweep unit and the alternating current electric power supply circuit, and after a first predetermined period elapses, the output of the alternating current electric power from the alternating current electric power supply circuit is stopped and the alternating current electric power is output from the alternating current sweep unit.

With the above configuration, the output voltage of the battery string can be controlled by controlling the states of the first switch and the second switch of the battery circuit module. Since the U-phase battery string, the V-phase battery string, and the W-phase battery string of the alternating current sweep unit are Y-connected, by controlling the output voltage of each battery string, alternating current electric power (for example, three-phase alternating current electric power) can be output to an external electric power supply. By converting the direct current electric power output from the direct current battery string into alternating current electric power using an inverter, alternating current electric power can be output from the alternating current electric power supply circuit to the external electric power supply.

Since the alternating current sweep unit outputs alternating current electric power by controlling the first switch and the second switch of the battery circuit module, it is relatively inefficient and it is desirable to restrict the maximum output (the maximum electric power). The alternating current electric power supply circuit is more efficient than the alternating current sweep unit because it outputs alternating current electric power using the inverter. The batteries included in the direct current battery string have higher output densities than the batteries included in the U-phase battery string, the V-phase battery string, and the W-phase battery string. Therefore, when a high output is required, alternating current electric power can be suitably output from the alternating current electric power supply circuit.

When the output of alternating current electric power is required for the electric power adjustment, alternating current electric power is output from the alternating current sweep unit and the alternating current electric power supply circuit, and after the first predetermined period elapses, the output of the alternating current electric power from the alternating current electric power supply circuit is stopped, and the alternating current electric power is output from the alternating current sweep unit. When there is an output request of alternating current electric power, high-output electric power can be output from the alternating current electric power supply circuit (the direct current battery string) including the battery with the high output density in addition to the output of the alternating current sweep unit. As a result, the current can be stabilized at an early stage. Then, since the current is stabilized after the lapse of the first predetermined period, it is possible to respond to the electric power adjustment by outputting the electric power only from the alternating current sweep unit.

In the above aspect, the control device may control the alternating current sweep unit and the alternating current electric power supply circuit such that when electric power consumption of the external electric power supply is requested as the electric power adjustment, charging of the batteries included in the alternating current sweep unit and the alternating current electric power supply circuit is performed, and after a second predetermined period elapses, charging of the batteries is performed according to states-of-charge (SOCs) of the batteries included in the alternating current sweep unit and the alternating current electric power supply circuit.

With the above configuration, when the electric power consumption of the external power supply is required for the electric power adjustment, the charging of the batteries included in the alternating current sweep unit and the alternating current electric power supply circuit is performed. In addition to the batteries (the batteries included in the U-phase battery string, the V-phase battery string, and the W-phase battery string) of the alternating current sweep unit, the batteries (the batteries included in the direct current battery string) of the alternating current electric power supply circuit including the battery with the high output density are charged. A battery with the high output density also has the high input density, so the current (charging current) can be stabilized at an early stage. Then, after the lapse of the second predetermined period, the current becomes stable, so that stable charging can be performed by performing charging according to the SOC of the battery.

In the above aspect, the control device may set the first predetermined period based on at least one of temperatures of the batteries included in the direct current battery string and SOCs of the batteries included in the direct current battery string.

For example, when the temperatures of the batteries included in the direct current battery string are high, when alternating current electric power is output from the alternating current electric power supply circuit, the deterioration of the batteries with the high temperature may be accelerated. Further, when the SOCs of the batteries included in the direct current battery string are small, in a case where alternating current electric power is output from the alternating current electric power supply circuit and the SOCs of the batteries become smaller, the deterioration of the battery may be accelerated. By setting the first predetermined period based on at least one of the temperatures of the batteries included in the direct current battery string and the SOCs of the batteries included in the direct current battery string, it is possible to restrict the deterioration of the battery.

In the above aspect, the energy densities of the batteries included in the U-phase battery string, the V-phase battery string, and the W-phase battery string may be higher than the energy densities of the batteries included in the direct current battery string.

With the above configuration, since the energy densities of the batteries included in the U-phase battery string, the V-phase battery string, and the W-phase battery string are higher than the energy densities of the batteries included in the direct current battery string, it is possible to efficiently and stably output alternating current electric power from the alternating current sweep unit. In addition, by combining a power-type battery (a high-output-type battery) with the high output density and an energy-type battery (a high-capacity-type battery) with a high energy density, it is possible to make each battery perform its favorite output (high output/long-term output). As a result, it is possible to provide an electric power supply system with a high output and a high capacity at a lower cost than an electric power supply system of the energy-type battery only or the power-type battery only.

In the above aspect, the batteries included in the direct current battery string may be nickel-hydrogen batteries, and the batteries included in the U-phase battery string, the V-phase battery string, and the W-phase battery string may be lithium-ion batteries.

In the electrified vehicles currently in widespread use, a nickel-hydrogen battery or a lithium-ion battery is often used as a battery used for storing electric power for driving. Therefore, the nickel-hydrogen battery and the lithium-ion battery used in the electrified vehicles can be reused to configure the electric power supply system of the present disclosure.

With the aspect of the present disclosure, it is possible to provide an electric power supply system that outputs alternating current electric power by using a battery string.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
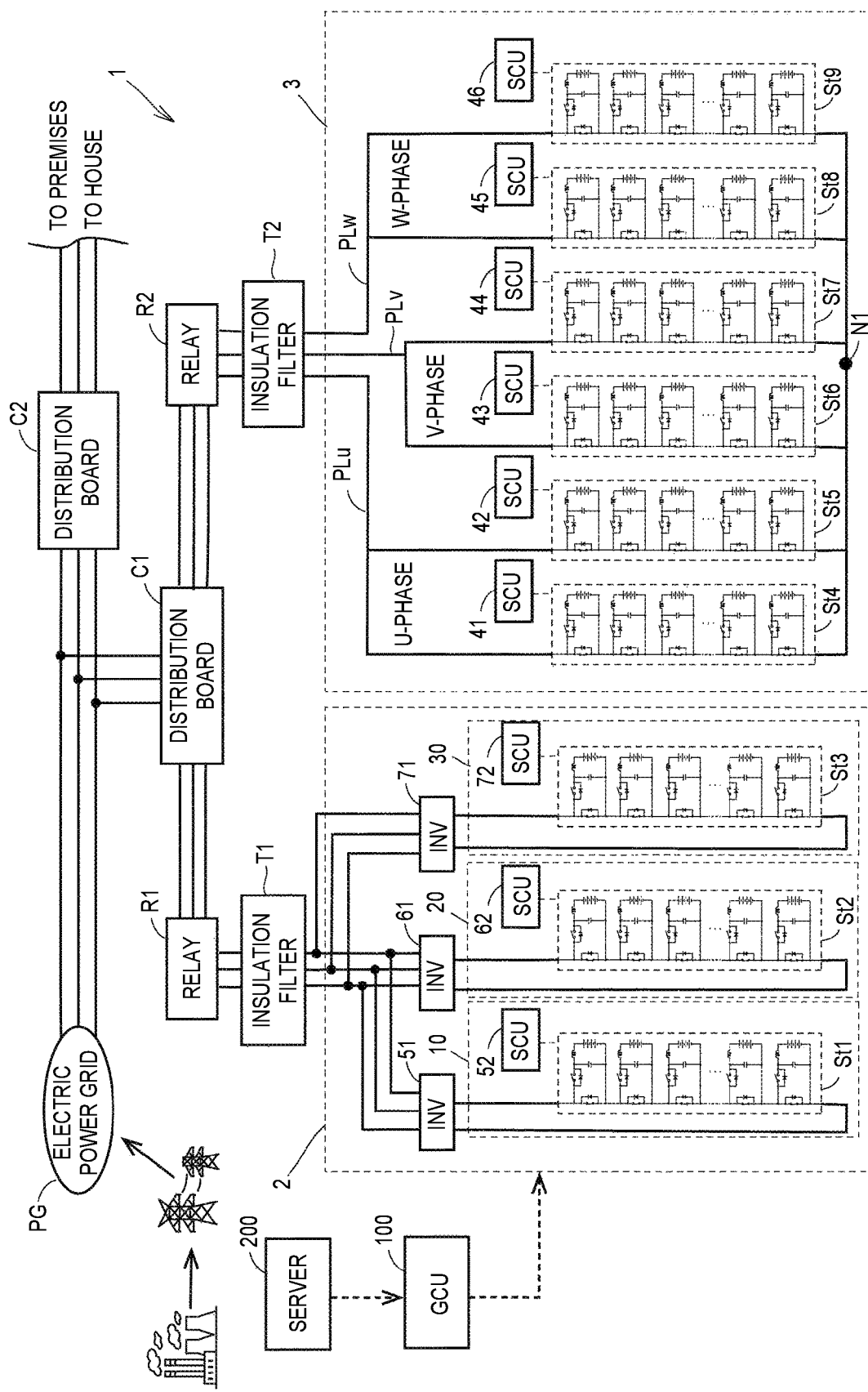
FIG. 1 is a diagram illustrating a configuration of an electric power supply system according to the present embodiment.

Hereinafter, embodiments of the present disclosure will be described in detail with reference to the drawings. The same or corresponding parts in the drawings are designated by the same reference signs and the description thereof will not be repeated.

FIG. 1 is a diagram illustrating a configuration of an electric power supply system according to the present embodiment. An electric power supply system 1 includes an alternating current electric power supply circuit 2, an alternating current sweep unit 3, insulation filters T1, T2, relays R1, R2, a distribution board C1, and a group control unit (GCU) 100. The electric power supply system 1 is applied to a building, such as a house, a school, a hospital, a commercial facility, or a train station. A distribution board C2 installed in a building is configured to receive electric power supply from each of an electric power grid PG and the electric power supply system 1. The distribution board C2 is connected to indoor wiring and distributes the electric power supplied from at least one of the electric power grid PG and the electric power supply system 1 to the indoor wiring. The supply and demand status of the electric power grid PG is managed by a server 200.

The alternating current electric power supply circuit 2 includes a first direct current sweep unit 10, a second direct current sweep unit 20, a third direct current sweep unit 30, a first inverter 51, a second inverter 61, and a third inverter 71. The first direct current sweep unit 10, the second direct current sweep unit 20, and the third direct current sweep unit 30 respectively include battery strings St1, St2, St3 and SCUs 52, 62, 72. Further, the alternating current sweep unit 3 includes battery strings St4 to St9 and SCUs 41 to 46. The SCU means "String Control Unit". In the present embodiment, the configurations of the SCUs 41 to 46, 52, 62, 72 and the battery strings St1 to St9 are substantially the same in each of the sweep units (the alternating current sweep unit 3, the first direct current sweep unit 10, the second direct current sweep unit 20, the third direct current sweep unit 30), so the configurations will be described with reference to FIG. 2 for only one sweep unit.

Figure 2:
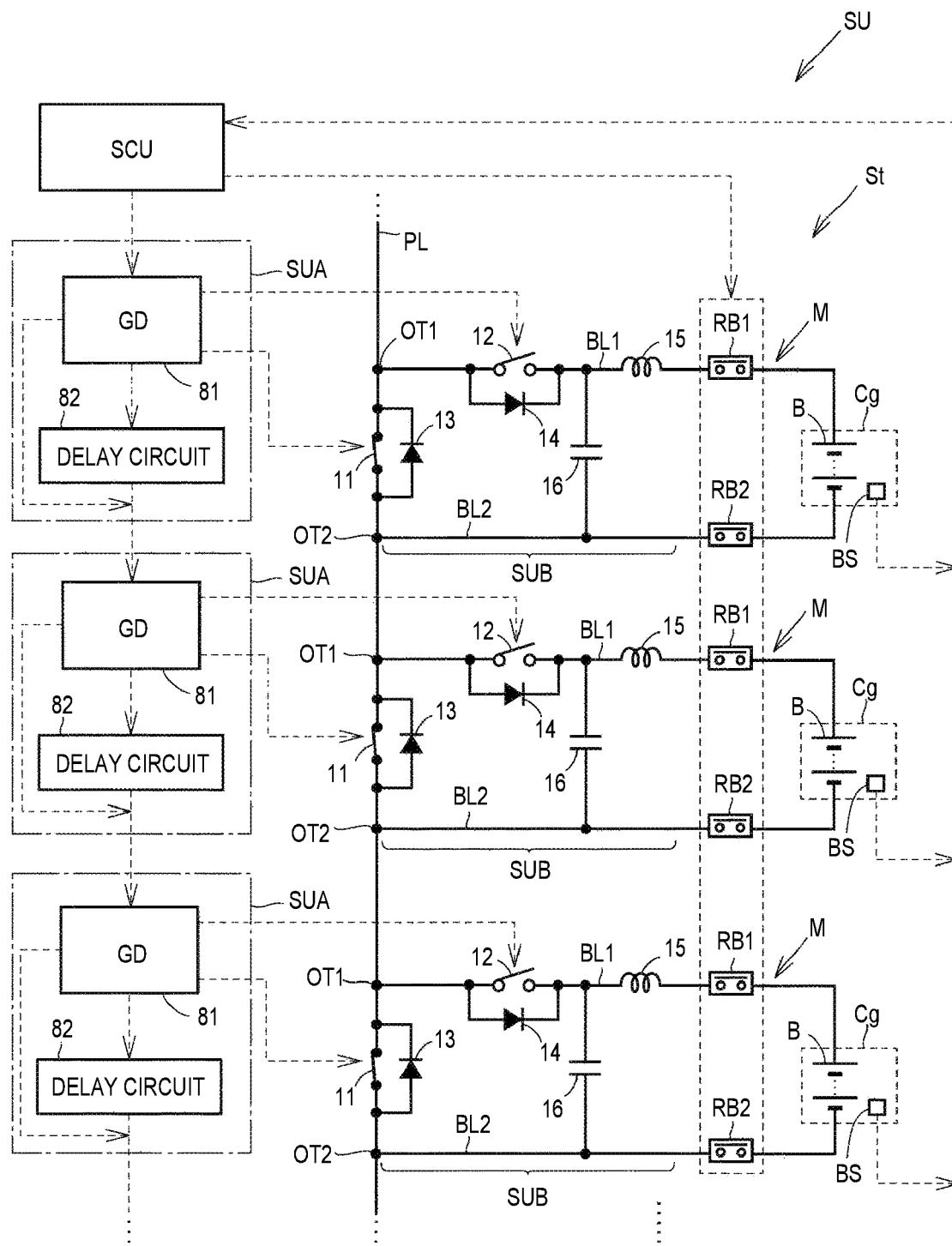
FIG. 2 is a diagram illustrating a configuration of a sweep unit.

FIG. 2 is a diagram illustrating a configuration of a sweep unit SU. The configuration of the sweep unit SU illustrated in FIG. 2 is common to the alternating current sweep unit 3, the first direct current sweep unit 10, the second direct current sweep unit 20, and the third direct current sweep unit 30. The sweep unit SU includes the SCU (corresponding to the SCUs 41 to 46, 52, 62, 72 illustrated in FIG. 1), a drive circuit SUA, and the battery string St (corresponds to the battery strings St1 to St9 illustrated in FIG. 1). The battery string St includes a plurality of battery circuit modules M. In the present embodiment, the number of battery circuit modules M included in the battery string St is 22, but the number is arbitrary and may be 5 to 50 or 100, or more. In the present embodiment, each of the battery strings St includes the same number of battery circuit modules M, but the number of battery circuit modules M may be different for each of the battery strings St.

Each of the battery circuit modules M includes an electric power circuit SUB and a cartridge Cg. The cartridge Cg includes a battery B and a monitoring unit BS. By connecting the electric power circuit SUB and the battery B, the battery circuit module M including the battery B is formed. The drive circuit SUA is configured to drive switches (more specifically, an SW 11 and an SW 12, which will be described below) included in the battery circuit module M. The battery B may be a nickel-hydrogen secondary battery or a lithium-ion secondary battery. By connecting the secondary batteries used in electrified vehicles in series, the secondary batteries used in the electrified vehicles may be reused for manufacturing the battery B.

As illustrated in FIG. 2, the battery circuit module M includes the electric power circuit SUB, the cartridge Cg, and circuit breakers RB1, RB2 (hereinafter, referred to as a "circuit breaker RB" when not distinguished). The electric power circuit SUB and the cartridge Cg are connected to each other via the circuit breakers RB1, RB2. The SCU is configured to switch a connection state (conduction/cutoff) between the electric power circuit SUB and the cartridge Cg by controlling ON/OFF of each of the circuit breakers RB according to a control command from the GCU 100. The circuit breaker RB may be an electromagnetic mechanical relay. The circuit breaker RB may be configured to be manually turned on/off by a user.

In the present embodiment, the cartridge Cg is configured to be detachably attached to the electric power circuit SUB. For example, when each of the circuit breakers RB1 and RB2 is in an OFF state (a cutoff state), a user may remove the cartridge Cg from the electric power circuit SUB. The battery string St can operate even when there is an empty cartridge, so the user can easily increase or decrease the number of cartridges Cg included in the battery string St. Such a battery string St is suitable for battery reuse.

In the cartridge Cg, the monitoring unit BS is configured to detect the state (for example, the voltage, the current, and the temperature) of the battery B and output the detection result to the SCU. The monitoring unit BS includes a voltage sensor that detects the voltage of the battery B, a current sensor that detects the current of the battery B, and a temperature sensor that detects the temperature of the battery B. Further, the monitoring unit BS may be a battery management system (BMS) that has, in addition to the sensor function, a state-of-charge (SOC) estimation function, a state-of-health (SOH) estimation function, a battery voltage equalization function, a diagnostic function, and a communication function. The SCU acquires the state (for example, the temperature, the current, the voltage, the SOC, and the internal resistance) of each battery B based on the output of each monitoring unit BS, and outputs the acquired state of each battery B to the GCU 100.

The battery circuit modules M included in the battery string St are connected by a common electric wire PL. The electric wire PL includes output terminals OT1 and OT2 of each battery circuit module M. By connecting the output terminal OT2 of one battery circuit module M to the output terminal OT1 of another battery circuit module M adjacent to the one battery circuit module M, the battery circuit modules M included in the battery string St are connected to each other.

The electric power circuit SUB includes a first switching element 11 (hereinafter, referred to as an "SW 11"), a second switching element 12 (hereinafter, referred to as an "SW 12"), a first diode 13, a second diode 14, a choke coil 15, a capacitor 16, and the output terminals OT1, OT2. Each of the SW 11 and the SW 12 is driven by the drive circuit SUA. The SW 11 and the SW 12 according to the present embodiment respectively correspond to examples of the "first switch" and the "second switch" according to the present disclosure.

The SW 11, the capacitor 16, and the battery B are connected in parallel between the output terminal OT1 and the output terminal OT2 of the electric power circuit SUB. The SW 11 is located on the electric wire PL and is configured to switch the connection state (conduction/cutoff) between the output terminal OT1 and the output terminal OT2. The output terminal OT1 is connected to a positive electrode of the battery B via an electric wire BL1, and the output terminal OT2 is connected to a negative electrode of the battery B via an electric wire BL2. The circuit breakers RB1, RB2 are respectively provided on the electric wires BL1, BL2. The electric wire BL1 is further provided with the SW 12 and the choke coil 15. In the battery circuit module M, when the SW 12 connected in series to the battery B is in an ON state (a conduction state) and the SW 11 connected in parallel with the battery B is in the OFF state (the cutoff state), the voltage of the battery B is applied between the output terminal OT1 and the output terminal OT2.

The capacitor 16 connected to each of the electric wire BL1 and the electric wire BL2 is provided between the output terminals OT1, OT2 and the battery B. One end of the capacitor 16 is connected to the electric wire BL1 between the SW 12 and the choke coil 15. The capacitor 16 smooths the voltage of the battery B and outputs it between the output terminal OT1 and the output terminal OT2.

Each of the SW 11 and the SW 12 is, for example, a field-effect transistor (FET). The first diode 13 and the second diode 14 are respectively connected in parallel to the SW 11 and the SW 12. The SW 12 is located between the output terminal OT1 and the choke coil 15. The choke coil 15 is located between the SW 12 and the positive electrode of the battery B. The battery B, the choke coil 15, and the capacitor 16 form an RCL filter. The current leveling is achieved by the RCL filter. Each of the SW 11 and the SW 12 is not limited to the FET, and may be a switch other than the FET.

The SCU generates a gate signal according to a control command from the GCU 100. The drive circuit SUA is provided for each battery circuit module M, and includes a gate driver (GD) 81 that drives the SW 11 and the SW 12 according to the gate signal, and a delay circuit 82 that delays the gate signal. Each of the SW 11 and the SW 12 included in the battery circuit module M is controlled to be turned on/off according to the gate signal.

Figure 3:
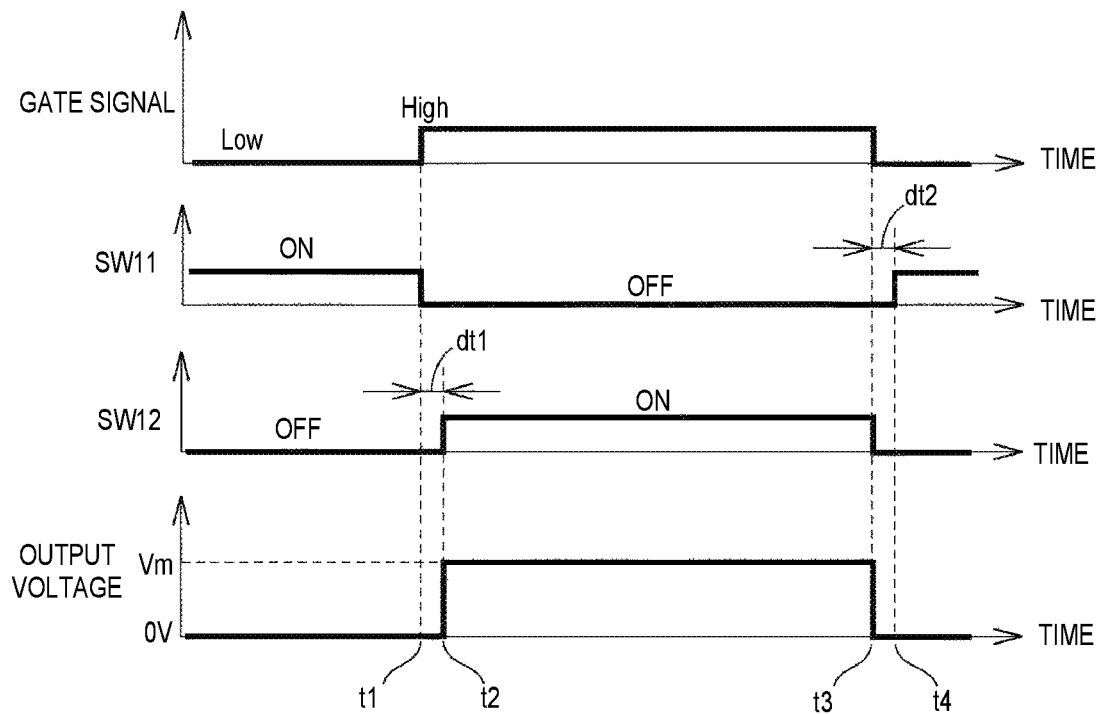
FIG. 3 is a time chart illustrating an example of an operation of a battery circuit module controlled by a gate signal.

FIG. 3 is a time chart illustrating an example of the operation of the battery circuit module M controlled by the gate signal. In the present embodiment, a rectangular wave signal is adopted as the gate signal for driving the SW 11 and the SW 12. "Low" and "High" of the gate signal illustrated in FIG. 3 respectively mean an L level and an H level of the gate signal (the rectangular wave signal). Further, the "output voltage" means a voltage output between the output terminal OT1 and the output terminal OT2.

In an initial state of the battery circuit module M, no gate signal is input to the drive circuit SUA (gate signal=L level), and the SW 11 and the SW 12 are respectively in the ON state and the OFF state.

When the gate signal is input to the drive circuit SUA, the GD 81 drives the SW 11 and the SW 12 according to the input gate signal. In the example illustrated in FIG. 3, at time t1, the gate signal rises from the L level to the H level, and the state of the SW 11 switches from the ON state to the OFF state at the same time as the rise of the gate signal. Then, the state of the SW 12 switches from the OFF state to the ON state at time t2 delayed by a predetermined time (hereinafter, referred to as a "dt1") from the rise of the gate signal. As a result, the battery circuit module M becomes a driven state. Hereinafter, a period from the rise of the gate signal to the elapse of the dt1 is also referred to as a "first delay period".

Figure 4:
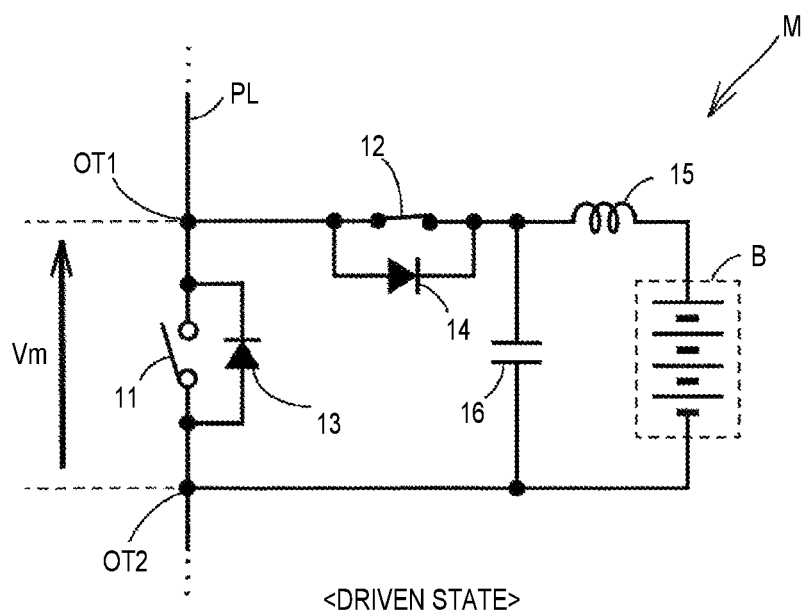
FIG. 4 is a diagram illustrating the battery circuit module in a driven state.

FIG. 4 is a diagram illustrating the battery circuit module M in the driven state. With reference to FIG. 4, in the battery circuit module M in the driven state, the state of the SW 11 becomes the OFF state and the state of the SW 12 becomes the ON state, and thus the voltage of the battery B is applied between the output terminal OT1 and the output terminal OT2. By applying the voltage of the battery B between the output terminal OT1 and the output terminal OT2 via the capacitor 16, a voltage Vm is output between the output terminal OT1 and the output terminal OT2.

With reference to FIG. 3 again, when the gate signal falls from the H level to the L level at time t3, the state of the SW 12 switches from the ON state to the OFF state at the same time as the fall of the gate signal. As a result, the battery circuit module M becomes a stopped state. In the battery circuit module M in the stopped state, the state of the SW 12 becomes the OFF state, and thus the voltage of the battery B is not applied between the output terminal OT1 and the output terminal OT2. Then, the state of the SW 11 switches from the OFF state to the ON state at time t4 delayed by a predetermined time (hereinafter, referred to as a "dt2") from the fall of the gate signal. The dt1 and the dt2 may be the same as or different from each other. In the present embodiment, each of the dt1 and the dt2 is set to 100 nanoseconds. However, each of the dt1 and the dt2 can be set arbitrarily.

Hereinafter, a period from the fall of the gate signal to the elapse of the dt2 is also referred to as a "second delay period". Further, a period from the end of the second delay period to a state in which the battery circuit module M becomes the driven state is also referred to as a "stop period".

Figure 5:
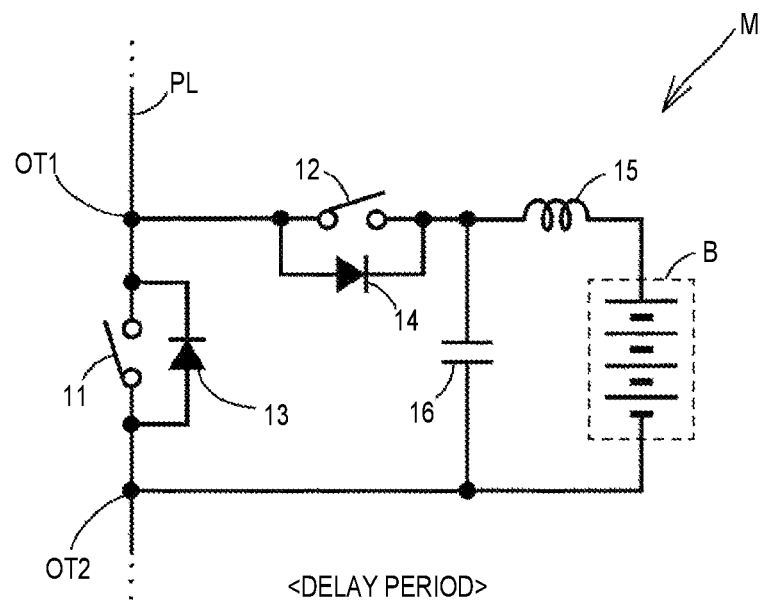
FIG. 5 is a diagram illustrating a state of the battery circuit module during a delay period.

FIG. 5 is a diagram illustrating the state of the battery circuit module M during the delay period. As illustrated in FIG. 5, both the SW 11 and the SW 12 are turned off in each of the first delay period and the second delay period.

Figure 6:
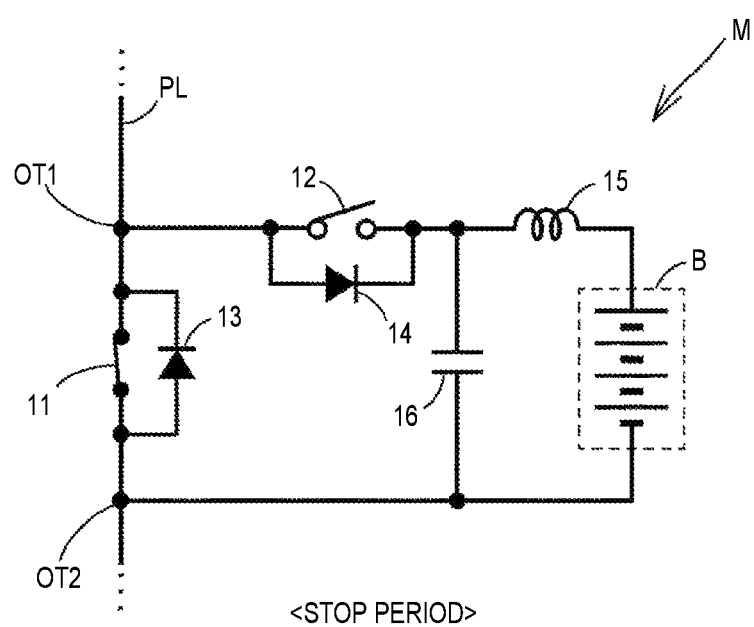
FIG. 6 is a diagram illustrating the state of the battery circuit module during a stop period.

FIG. 6 is a diagram illustrating the state of the battery circuit module M during the stop period. As illustrated in FIG. 6, during the stop period, the SW 11 is in the ON state and the SW 12 is in the OFF state, as in the initial state.

The battery circuit module M is in the stopped state in both the delay period and the stop period. In the battery circuit module M in the stopped state, no voltage is applied between the output terminal OT1 and the output terminal OT2. By providing the first delay period and the second delay period, the SW 11 and the SW 12 are restricted from being in the ON state at the same time (that is, the battery circuit module M is short-circuited).

By controlling the battery circuit module M included in the battery string St as described above, the number of the battery circuit modules M in the driven state can be adjusted, and thus the output voltage of the battery string St can be controlled. By adjusting the number of battery circuit modules M that are in the driven state at the same time, the sweep unit SU is configured to be able to output a voltage from 0 V to the sum of the voltages of respective batteries B included in the battery string St.

Figure 7:
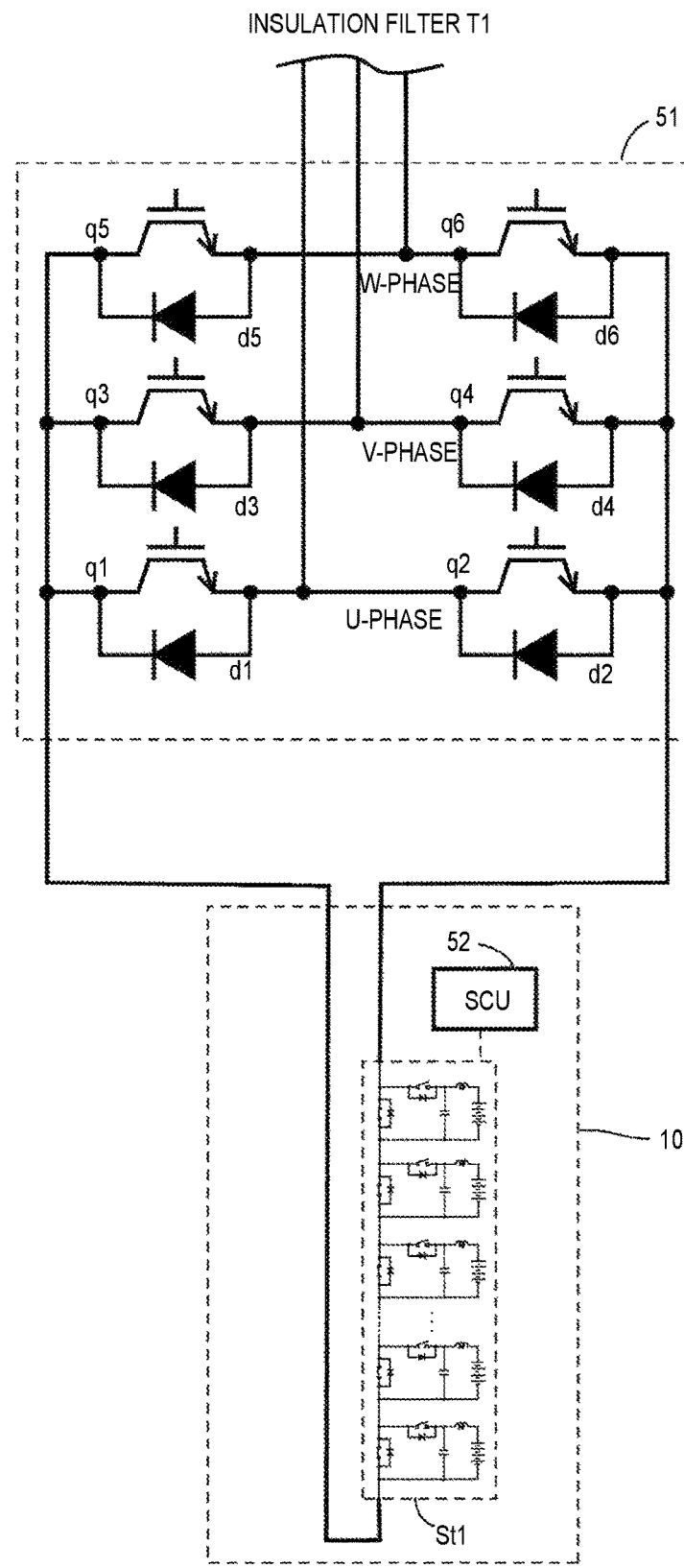
FIG. 7 is a diagram illustrating a configuration of a first inverter.

With reference to FIG. 1 again, the first direct current sweep unit 10 has the configuration of the sweep unit SU. That is, the first direct current sweep unit 10 includes the battery string St1 and the SCU 52. The battery B of the battery circuit module M included in the battery string St1 is a nickel-metal hydride secondary battery. The direct current electric power output from the first direct current sweep unit 10 is input to the first inverter 51. FIG. 7 is a diagram illustrating the configuration of the first inverter 51. With reference to FIG. 7 with FIG. 1, the first inverter 51 is a three-phase inverter and includes switching elements q1, q2 connected in series to a U-phase arm, switching elements q3, q4 connected in series to a V-phase arm, and switching elements q5, q6 connected in series to a W-phase arm. Diodes d1 to d6 are respectively connected in antiparallel to portions between collectors and emitters of the respective switching elements q1 to q6.

A midpoint of each phase arm of the first inverter 51 is connected to an insulation filter T1 and further connected to the electric power grid PG via the relay R1 and the distribution board C1 (see FIG. 1). Each of the switching elements q1 to q6 of the first inverter 51 is turned on/off by a control command from the GCU 100 by, for example, a pulse width modulation (PWM) control. The first inverter 51 converts the direct current electric power output from the first direct current sweep unit 10 into alternating current electric power (three-phase alternating current electric power) and supplies it to the electric power grid PG. Further, the first inverter 51 converts the alternating current electric power (three-phase alternating current electric power) supplied from the electric power grid PG into direct current electric power and supplies it to the first direct current sweep unit 10 to charge the battery B of the battery string St1. In the present embodiment, the first inverter 51 reuses the three-phase inverter used to drive a three-phase synchronous motor of an electrified vehicle.

In FIG. 1, each of the second direct current sweep unit 20 including the battery string St2 and the SCU 62 and the third direct current sweep unit 30 including the battery string St3 and the SCU 72 has the same configuration as the first direct current sweep unit 10. Each of the second inverter 61 connected to the second direct current sweep unit 20 and the third inverter 71 connected to the third direct current sweep unit 30 has the same configuration as the first inverter 51 illustrated in FIG. 7. The first direct current sweep unit 10, the second direct current sweep unit 20, and the third direct current sweep unit 30 are connected in parallel to the insulation filter T1 as illustrated in FIG. 1. The midpoints (see FIG. 7) of respective phase arms of the first inverter 51, the second inverter 61, and the third inverter 71 are connected by an electric power line. Then, the alternating current electric power supply circuit 2 outputs alternating current electric power (three-phase alternating current electric power) from the first direct current sweep unit 10, the second direct current sweep unit 20, and the third direct current sweep unit 30, which are connected in parallel, to the insulation filter T1 via the first to third inverters 51, 61, 71.

Figure 8:
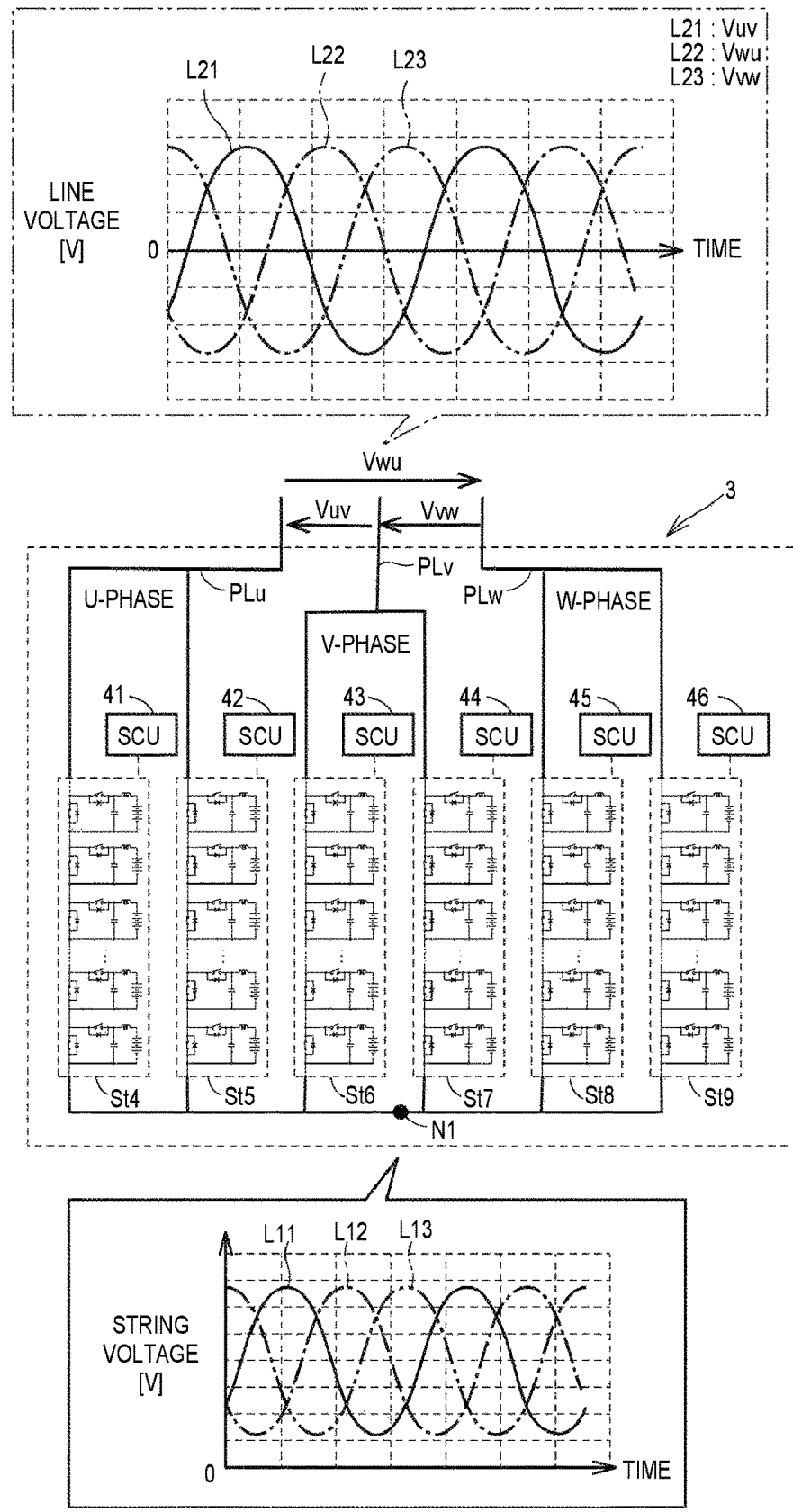
FIG. 8 is a diagram illustrating a configuration of an alternating current sweep unit.

FIG. 8 is a diagram illustrating the configuration of the alternating current sweep unit 3. With reference to FIG. 8, the battery strings St4, St5 respectively correspond to a first U-phase battery string and a second U-phase battery string. Further, the battery strings St6, St7 respectively correspond to a first V-phase battery string and a second V-phase battery string. In addition, the battery strings St8, St9 respectively correspond to a first W-phase battery string and a second W-phase battery string. Each of the battery strings St4 to St9 has substantially the same configuration as the battery string St illustrated in FIG. 2, and each of the SCUs 41 to 46 has substantially the same configuration as the SCU illustrated in FIG. 2.

In the present embodiment, the battery B of the battery circuit module M included in each of the battery strings St4, St6, St8 is a ternary system (NMC) lithium-ion secondary battery. Further, the battery B of the battery circuit module M included in each of the battery strings St5, St7, St9 is an iron phosphate-based (LFP) lithium-ion secondary battery.

In FIG. 8, the positive electrode terminal of the battery string St4 and the positive electrode terminal of the battery string St5 are connected to an electric power line PLu. The positive electrode terminal of the battery string St6 and the positive electrode terminal of the battery string St7 are connected to an electric power line PLv. The positive electrode terminal of the battery string St8 and the positive electrode terminal of the battery string St9 are connected to an electric power line PLw. Further, the negative electrode terminals of the respective battery strings St4 to St9 are connected to a neutral point N1. The alternating current sweep unit 3 has a configuration in which the battery strings St4, St5 connected in parallel, the battery strings St6, St7 connected in parallel, and the battery strings St8, St9 connected in parallel are Y-connected.

The SCUs 41 to 46 control the SWs 11 and the SWs 12 of the respective battery circuit modules M at a switching frequency of several tens of kHz by a control command from GCU 100, in such a manner that the SCUs 41 to 46 control the string voltages (the output voltages) of the respective battery strings St4 to St9 so as to have the voltage waveform illustrated in the lower part of FIG. 8. In FIG. 8, a line L11 shows the string voltage of the U-phase battery strings (the battery strings St4, St5). A line L12 shows the string voltage of the V-phase battery strings (the battery strings St6, St7). Further, a line L13 shows the string voltage of the W-phase battery strings (the battery strings St8, St9). The line L11, the line L12, and the line L13 are sinusoidal waves out of phase by 120°, and the frequency thereof is 60 Hz corresponding to the electric power grid PG.

By controlling the respective string voltages of the battery strings St4 to St9 in this way, the line voltages of the electric power lines PLu, PLv, PLw become the voltage waveforms shown in the upper part of FIG. 8. In FIG. 8, a line L21 indicates the line voltage "Vuv" between the electric power line PLu and the electric power line PLv, and a line L22 indicates the line voltage "Vwu" between the electric power line PLw and the electric power line PLu. Further, a line L23 indicates the line voltage "Vvw" between the electric power line PLv and the electric power line PLw. Each line voltage has a sinusoidal alternating current waveform of which the polarity (positive/negative) changes periodically. As a result, alternating current electric power (three-phase alternating current electric power) is output from the alternating current sweep unit 3.

With reference to FIG. 1 again, the alternating current electric power output from the alternating current electric power supply circuit 2 is supplied to the electric power grid PG via the insulation filter T1, the relay R1, and the distribution board C1. The alternating current electric power output from the alternating current sweep unit 3 is supplied to the electric power grid PG via the insulation filter T2, the relay R2, and the distribution board C1. In this way, the electric power supply system 1 is capable of grid-coordinated operation in which three-phase alternating current electric power is reverse-flowed from the alternating current electric power supply circuit 2 and the alternating current sweep unit 3 to the electric power grid PG.

Each of the insulation filters T1, T2 includes, for example, an LCL filter and a three-phase transformer. Each of the insulation filters T1, T2 reduces a noise component of a three-phase alternating current component by the LCL filter, converts the three-phase alternating current power into a predetermined voltage (for example, 200 V) by the three-phase transformer, and insulates the input side and the output side.

Each of the relays R1, R2 may be, for example, an electromagnetic mechanical relay. By controlling the ON/OFF of the relay R1 by the GCU 100, the alternating current electric power supply circuit 2 and the electric power grid PG are connected (parallel)/cut off (disconnected). Further, by controlling ON/OFF of the relay R2 by the GCU 100, the alternating current sweep unit 3 and the electric power grid PG are connected (parallel)/cut off (disconnected).

The distribution board C1 includes an earth leakage circuit breaker and/or a breaker. When charging the batteries B of the battery strings St included in the alternating current electric power supply circuit 2 and the alternating current sweep unit 3, the distribution board C1 distributes the electric power of the electric power grid PG to the alternating current electric power supply circuit 2 and the alternating current sweep unit 3. Further, the distribution board C1 supplies the electric power output from the alternating current electric power supply circuit 2 and the alternating current sweep unit 3 to the electric power grid PG and/or the distribution board C2.

When charging the batteries B of the battery strings St included in the alternating current electric power supply circuit 2, the batteries B are charged by converting the alternating current electric power supplied from the electric power grid PG into direct current electric power by the first to third inverters 51, 61, 71. When charging the batteries B of the battery strings St included in the alternating current sweep unit 3, the SCUs 41 to 46 control the SWs 11 and the SWs 12 so that the voltage of the battery strings St becomes slightly lower than the alternating current voltage supplied from the electric power grid PG to charge the batteries B.

The alternating current electric power output by the alternating current electric power supply circuit 2 and the alternating current electric power output by the alternating current sweep unit 3 are supplied to the wiring in the premises or the house via the distribution board C2 together with the alternating current electric power output by the electric power grid PG.

The server 200 manages the supply and demand of the electric power grid PG (an electric power network) provided by an electric power company (an electric power generation company and an electric power transmission and distribution company). The server 200 is configured to be communicable with the GCU 100, and requests the GCU 100 to adjust the electric power of the electric power grid PG as necessary. In response to the request from the server 200, the GCU 100 controls each SCU, the first to third inverters 51, 61, 71, the relays R1, R2, and adjusts the input/output electric power of the alternating current electric power supply circuit 2 and the alternating current sweep unit 3.

The electric power adjustments requested from the server 200 are roughly classified into a lowering demand response (DR) and a raising DR. The lowering DR is a request to reduce the demand for electric power. In the present embodiment, when requesting the lowering DR, by discharging the batteries B included in the battery circuit modules M of the battery string St, three-phase alternating current electric power is output from the electric power supply system 1 and reverse electric power flow is performed to the electric power grid PG. When the output of the alternating current electric power is requested for the electric power adjustment, the alternating current electric power is output from the electric power supply system 1. The raising DR is a request to raise the demand for electric power. In the present embodiment, when requesting the raising DR, the electric power supply system 1 responds to the request by charging the batteries B included in the battery circuit modules M of the battery string St. When the electric power consumption of the electric power grid PG is requested as the electric power adjustment, the battery B is charged.

Figure 9:
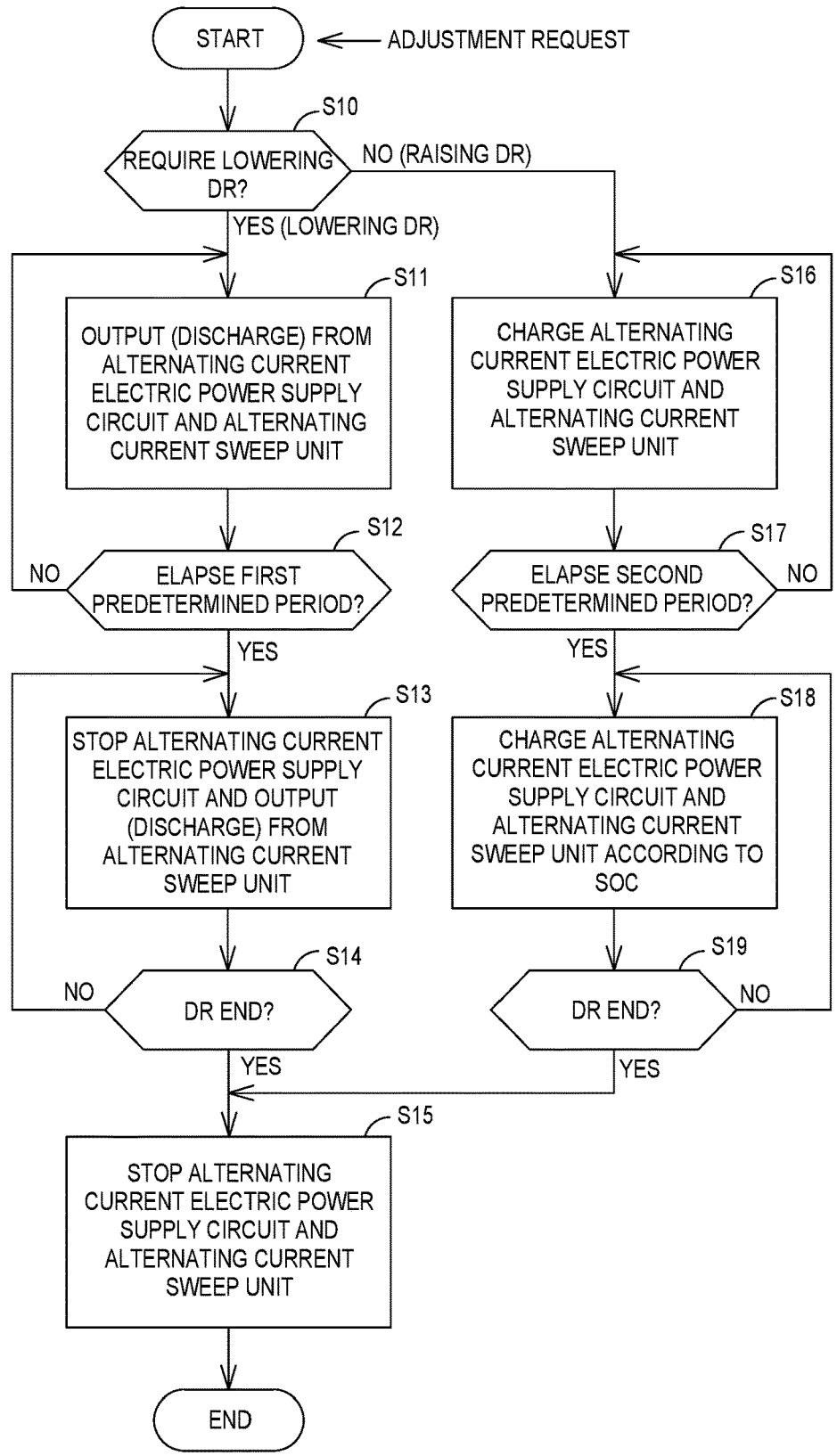
FIG. 9 is a flowchart illustrating an example of processing executed by a group control unit when an electric power adjustment request is made from a server.

FIG. 9 is a flowchart illustrating an example of processing executed by the GCU 100 when the electric power adjustment request is made from the server 200. The flowchart is executed when the GCU 100 receives the adjustment request from the server 200. When the adjustment request is received from the server 200, a determination is made in step 10 (hereinafter, step is abbreviated as "S") as to whether the adjustment request is a lowering DR request. When the adjustment request is a lowering DR, a positive determination is made and the process proceeds to S11. When the adjustment request is a raising DR, a negative determination is made and the process proceeds to S16.

In S11, the GCU 100 causes the alternating current electric power supply circuit 2 and the alternating current sweep unit 3 to output alternating current electric power in response to the request for the lowering DR, and then makes the alternating current electric power be supplied to the electric power grid PG. The GCU 100 turns on the relay R1 and connects (parallel) the alternating current electric power supply circuit 2 and the electric power grid PG. The GCU 100 causes the first direct current sweep unit 10, the second direct current sweep unit 20, and the third direct current sweep unit 30 to output direct current electric power by controlling the SWs 11 and the SWs 12 of the battery strings St1 to St3 with the SCUs 52, 62, 72. The GCU 100 converts the direct current electric power into alternating current electric power using the first to third inverters 51, 61, 71, and makes the alternating current electric power (the three-phase alternating current electric power) be supplied to the electric power grid PG. In addition, the GCU 100 turns on the relay R2 and connects (parallel) the alternating current sweep unit 3 and the electric power grid PG. In addition, the GCU 100 controls the SWs 11 and the SWs 12 of the battery strings St4 to St9 by the SCUs 41 to 46 and outputs alternating current electric power (three-phase alternating current electric power) from the alternating current sweep unit 3.

In the following S12, a determination is made as to whether a first predetermined period has elapsed since the output of the alternating current electric power was started from the alternating current electric power supply circuit 2 and the alternating current sweep unit 3. The first predetermined period may be, for example, five seconds. When the first predetermined period has not elapsed, a negative determination is made and the process returns to S11, and the output of the alternating current electric power is continued from the alternating current electric power supply circuit 2 and the alternating current sweep unit 3. When the first predetermined period elapses, a positive determination is made and the process proceeds to S13.

In S13, the output of the alternating current electric power from the alternating current electric power supply circuit 2 is stopped, and alternating current electric power is output from the alternating current sweep unit 3. Further, the relay R1 is turned off and the alternating current electric power supply circuit 2 and the electric power grid PG are cut off (disconnected). The GCU 100 stops driving of the first to third inverters 51, 61, 71 and makes the SWs 11 of the battery strings St1 to St3 be set to the ON state by the SCUs 52, 62, 72 and makes the SWs 12 thereof be set to the ON state, in such a manner that the GCU 100 makes the battery circuit modules M be set to the stopped state (see FIG. 6).

In the following S14, a determination is made as to whether the period of the lowering DR has ended. For example, when the adjustment time of the lowering DR requested from the server 200 is completed, a determination may be made that the period of the lowering DR has ended. When the period of the lowering DR has not ended, a negative determination is made and the process returns to S13, and the output of the alternating current electric power is continued from the alternating current sweep unit 3. When the period of the lowering DR ends, a positive determination is made and the process proceeds to S15.

In S15, the output of alternating current electric power from the alternating current sweep unit 3 is also stopped. The GCU 100 turns off the relay R2 and cuts off (disconnects) the alternating current sweep unit 3 and the electric power grid PG. In addition, the GCU 100 makes the SWs 11 of the battery strings St4 to St9 be set to the ON state by the SCUs 41 to 46, makes the SWs 12 thereof be set to the ON state, and makes the battery circuit modules M be set to the stopped state (see FIG. 6), in such a manner that the GCU 100 stops the output from the alternating current sweep unit 3 and ends the routine.

In S16, the GCU 100 charges the batteries B included in the alternating current electric power supply circuit 2 and the alternating current sweep unit 3 in response to the request for the raising DR. The GCU 100 turns on the relay R1 and connects (parallel) the alternating current electric power supply circuit 2 and the electric power grid PG. The GCU 100 converts the alternating current electric power of the electric power grid PG into direct current electric power by using the first to third inverters 51, 61, 71. The GCU 100 charges the batteries B included in the first direct current sweep unit 10, the second direct current sweep unit 20, and third direct current sweep unit 30 by controlling the SWs 11 and the SWs 12 of the battery strings St1 to St3 with the SCUs 52, 62, 72. The GCU 100 turns on the relay R2 and connects (parallel) the alternating current sweep unit 3 and the electric power grid PG. The GCU 100 controls the SWs 11 and the SWs 12 by the SCUs 41 to 46 so that the voltage of each battery string St becomes lower than the alternating current voltage supplied from the electric power grid PG and charges the batteries B of each battery string St included in the alternating current sweep unit 3.

In the following S17, a determination is made as to whether a second predetermined period has elapsed since the alternating current electric power supply circuit 2 and the alternating current sweep unit 3 started charging. The second predetermined period may be, for example, five seconds. When the second predetermined period has not elapsed, a negative determination is made and the process returns to S16, and charging of the batteries B included in the alternating current electric power supply circuit 2 and the alternating current sweep unit 3 is continued. When the second predetermined period has elapsed, a positive determination is made and the process proceeds to S18.

In S18, the battery B is charged according to the SOC of the battery B. The GCU 100 acquires the SOC of each of the batteries B from the monitoring units BS of the battery circuit modules M of the battery strings St in the alternating current electric power supply circuit 2 and the alternating current sweep unit 3. The GCU 100 controls the SWs 11 and the SWs 12 by the SCU so that the SOC of each of the batteries B included in the battery string St becomes uniform based on the SOC of each of the batteries B. For example, the SWs 11 and the SWs 12 are controlled by the SCU 52 so that the SOC of each of the batteries B included in the battery string St1 of the first direct current sweep unit 10 becomes uniform. Similarly, in other sweep units (the alternating current sweep unit 3, the second direct current sweep unit 20, and the third direct current sweep unit 30), the SWs 11 and the SWs 12 are controlled by the SCU so that the SOC of each of the batteries B included in the battery string St of the sweep unit becomes uniform. As a result, the SOC of each battery string St is adjusted.

In S18, the charging of the batteries B (the battery strings St) may be controlled so that the SOC of each of the battery strings St becomes the same value. Further, the charging of the batteries B (the battery strings St) may be controlled such that the SOC of the battery strings St4 to St9 included in the alternating current sweep unit 3 is larger than the SOC of the battery strings St1 to St3 included in the alternating current electric power supply circuit 2. In the case, for example, when the SOC of the battery strings St1 to St3 exceeds 80%, the GCU 100 turns off the relay R1, cuts off (disconnects) the alternating current electric power supply circuit 2 and the electric power grid PG, and stops driving of the first to third inverters 51, 61, 71. Then, the GCU 100 makes the SWs 11 of the battery strings St1 to St3 be set to the ON state by the SCUs 52, 62, 72 and makes the SWs 12 thereof be set to the ON state, in such a manner that the GCU 100 makes the battery circuit modules M be set to the stopped state and stops charging.

In the following S19, a determination is made as to whether the period of the raising DR has ended. For example, when the adjustment time of the raising DR requested from the server 200 is completed, a determination may be made that the period of the raising DR has ended. When the period of the raising DR has not ended, a negative determination is made and the process returns to S18 to continue charging of the batteries B. When the period of the raising DR ends, a positive determination is made and the process proceeds to S15.

In S15, the charging of the batteries B is stopped. The GCU 100 turns off the relay R2 and cuts off (disconnects) the alternating current sweep unit 3 and the electric power grid PG. In addition, the GCU 100 makes the SWs 11 of the battery strings St4 to St9 be set to the ON state by the SCUs 41 to 46, makes the SWs 12 thereof be set to the ON state, in such a manner that the GCU 100 makes the battery circuit modules M be set to the stopped state and stops the charging of the batteries B of the alternating current sweep unit 3. Further, when the batteries B of the alternating current electric power supply circuit 2 are being charged, as described above, the GCU 100 turns off the relay R1, cuts off (disconnects) the alternating current electric power supply circuit 2 and the electric power grid PG, and stops the driving of the first to third inverters 51, 61, 71. Next, the GCU 100 makes the SWs 11 of the battery strings St1 to St3 be set to the ON state by the SCU 52, 62, 72 and makes the SWs 12 thereof be set to the ON state, in such a manner that the GCU 100 makes the battery circuit modules M be set to the stopped state. Then, the GCU 100 stops the charging and ends the routine.

Each of the batteries B included in the battery strings St1 to St3 of the first direct current sweep unit 10, the second direct current sweep unit 20 and the third direct current sweep unit 30 that are included in the alternating current electric power supply circuit 2 is a nickel-hydrogen secondary battery. Each of the batteries B included in the battery strings St4 to St9 of the alternating current sweep unit 3 is a lithium-ion secondary battery. With respect to the lithium-ion secondary battery and the nickel-hydrogen secondary battery used in the sweep units, an energy density (Wh/kg) of the lithium-ion secondary battery is higher than the energy density of the nickel-hydrogen secondary battery. That is, it can be said that the nickel-hydrogen secondary battery according to the present embodiment is located in the upper left region in the Ragone plot and is a power-type (output-type) battery. Further, it can be said that the lithium-ion secondary battery according to the present embodiment is located in the lower right region in the Ragone plot and is an energy-type (capacitive-type) battery.

In the alternating current sweep unit 3, since the SWs 11 and the SWs 12 of each battery string St are controlled at several tens of kHz to output alternating current electric power, the efficiency is low and it is desirable that the maximum output (the maximum electric power) is restricted. Therefore, in order to increase the output (kW) of the alternating current sweep unit 3, it is necessary to increase the number of parallels of the battery strings St, which leads to an increase in cost. Since it is desirable that the alternating current sweep unit 3 restricts the maximum output (the maximum electric power), it is preferable to use each battery B of the alternating current sweep unit 3 so as to charge and discharge at a low rate (small current). Therefore, the batteries B of each battery string St of the alternating current sweep unit 3 may be energy-type batteries having a high energy density. Therefore, in the present embodiment, the lithium-ion secondary battery is used.

On the contrary, in the alternating current electric power supply circuit 2, since alternating current electric power is output by using an inverter, the efficiency is relatively high and the maximum output can be increased. Therefore, by using a power-type battery having a high output density as each battery B (that is, each of the batteries B included in the battery strings St1 to St3 of the first direct current sweep unit 10, the second direct current sweep unit 20, and the third direct current sweep unit 30) of the alternating current electric power supply circuit 2, a large output (kW) can be output from the alternating current electric power supply circuit 2. Therefore, in the present embodiment, the nickel-hydrogen secondary battery is used.

According to the example of FIG. 9, when the electric power adjustment request is made from the server 200, when the adjustment request is the request of a lowering DR and an output of alternating current electric power is requested for the electric power adjustment (a positive determination in S10), alternating current electric power is output from the alternating current sweep unit 3 and the alternating current electric power supply circuit 2 (S11). When there is the request for alternating current electric power output, in addition to the output of the alternating current sweep unit 3, high output electric power is output from the alternating current electric power supply circuit 2 (the battery strings St1 to St3 of the first direct current sweep unit 10, the second direct current sweep unit 20, and the third direct current sweep unit 30) including the batteries with the high output densities, so that the current can be stabilized at an early stage. Then, after the lapse of the first predetermined period (a positive determination in S12), the output of the alternating current electric power from the alternating current electric power supply circuit 2 is stopped and the alternating current electric power is output from the alternating current sweep unit 3 (S13). Since the current stabilizes after the lapse of the first predetermined period, it is possible to respond to the electric power adjustment by outputting the electric power only from the alternating current sweep unit 3. In particular, in the present embodiment, the battery B of the battery string St of the alternating current sweep unit 3 has a high energy density, and can efficiently and stably output alternating current electric power over a long period of time.

According to the example of FIG. 9, when the electric power adjustment request is made from the server 200, when the adjustment request is the request of a raising DR and the power consumption of the electric power grid PG (the external electric power supply) is requested for the electric power adjustment (a negative determination in S10), the batteries B included in the alternating current sweep unit 3 and the alternating current electric power supply circuit 2 are charged (S16). When there is the electric power consumption request for the electric power grid PG, in addition to the batteries B included in the alternating current sweep unit 3, the batteries B (the batteries B included in the first direct current sweep unit 10, the second direct current sweep unit 20, and the third direct current sweep unit 30) of the alternating current electric power supply circuit 2 including the batteries having the high output densities are charged. The battery B, which has a high output density, has a high input density, so that the current (charging current) can be stabilized at an early stage. Then, after the lapse of the second predetermined period, the current becomes stable, so that stable charging can be performed by charging according to the SOC of the battery B.

Figure 10A:
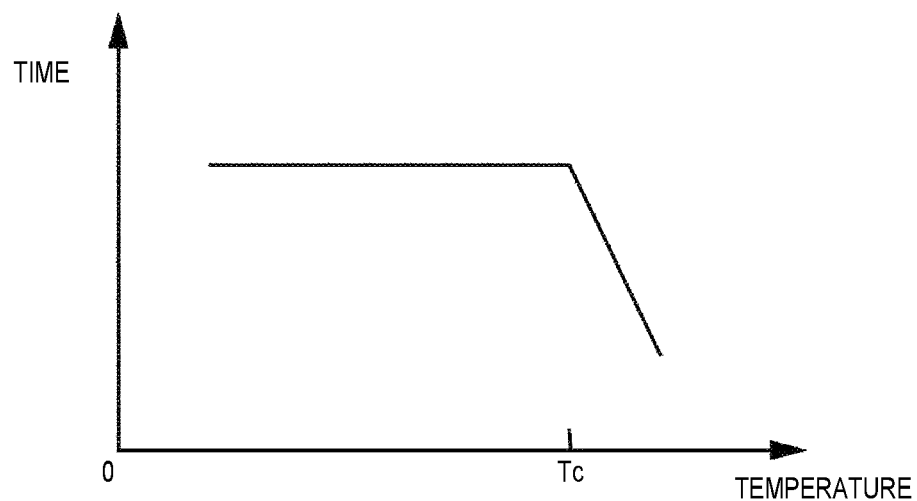
FIG. 10A is a graph illustrating an example of a map used for setting a first predetermined period.
Figure 10B:
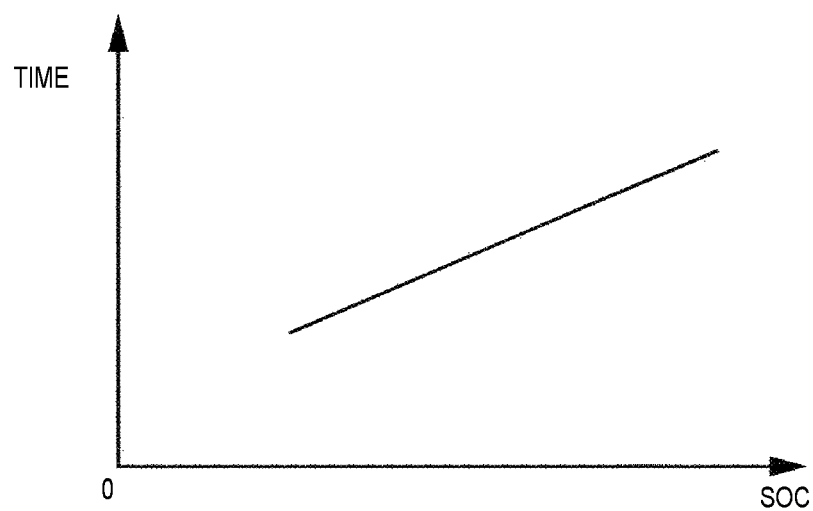
FIG. 10B is a graph illustrating an example of another map used for setting the first predetermined period.

In the embodiment, the first predetermined period may be set according to the states of the batteries B (the battery strings St1 to St3) included in the alternating current electric power supply circuit 2. FIGS. 10A and 10B are diagrams illustrating examples of maps used for setting the first predetermined period. FIG. 10A is a map used for setting the first predetermined period based on the temperature of battery B of the alternating current electric power supply circuit 2. The horizontal axis is the temperature of the battery B, and the vertical axis is the time of the first predetermined period. The temperature of the battery B may be the battery temperature detected by the monitoring unit BS. The temperature of the battery B on the horizontal axis may be, for example, the maximum value of the temperature of the battery B included in the battery strings St1 to St3. Further, the average temperature of the batteries B included in the battery string St is set as the temperature of the battery string St, and among the temperatures of the battery strings St1 to St3, the temperature of the battery string St, which has the highest temperature, may be set as the temperature of the battery B on the horizontal axis of FIG. 10A.

When the temperatures of the batteries B (the batteries B of the battery strings St1 to St3) included in the alternating current electric power supply circuit 2 are high, for example, in a case in which discharging is performed from the batteries B in a state where the temperatures of the batteries B are higher than a temperature Tc illustrated in FIG. 10A, the deterioration of the batteries B may be accelerated. Therefore, as illustrated in FIG. 10A, when the temperatures of the batteries B are higher than the temperature Tc, by setting the first predetermined period short, the discharge time (the output time of the alternating current electric power from the alternating current electric power supply circuit 2) of the batteries B can be shortened, and thus the deterioration of the batteries B can be restricted.

FIG. 10B is a map used for setting the first predetermined period based on the SOC of the battery B of the alternating current electric power supply circuit 2. The horizontal axis is the SOC of the battery B, and the vertical axis shows the time of the first predetermined period. The SOC of the battery B may be the SOC estimated by the monitoring unit BS. In the present embodiment, as described above, the SWs 11 and the SWs 12 are controlled by the SCU so that the SOCs of the batteries B included in the battery string St become uniform when the batteries B are charged. Therefore, the SOC of the battery B on the horizontal axis can be regarded as the SOC of the battery strings St1 to St3. When the SOCs of the batteries B included in the battery strings St1 to St3 are small, when alternating current electric power is output from the alternating current electric power supply circuit 2, the SOCs of the batteries B become much smaller than the allowable lower limit, which may accelerate the deterioration of the batteries B. Therefore, as illustrated in FIG. 10B, the smaller the SOCs of the batteries B, the shorter the first predetermined period is set, in such a manner that the discharge time (the output time of the alternating current electric power from the alternating current electric power supply circuit 2) of the batteries B is shortened and the deterioration of the batteries B is restricted.

The first predetermined period may be set using the map of FIG. 10A or the map of FIG. 10B, or may be set using both the maps of FIGS. 10A and 10B. When the first predetermined period is set using both the maps, the shorter of the first predetermined period set using the map of FIG. 10A and the first predetermined period set using the map of FIG. 10B is set as the first predetermined period.

According to the present embodiment, a nickel-hydrogen secondary battery with a high output density is used as the battery of the battery string St of the alternating current electric power supply circuit 2 that converts the outputs of the first to third direct current sweep units 10 to 30 into alternating current electric power using the first to third inverters 51, 61, 71 and outputs the alternating current electric power. Further, as the batteries B of the alternating current sweep unit 3 in which alternating current electric power is output from the Y-connected U-phase battery strings (the battery strings St4 and St5), the Y-connected V-phase battery strings (the battery strings St6 and St7), and the Y-connected W-phase battery strings (the battery strings St8 and St9), lithium-ion secondary batteries with the high energy densities are used. Therefore, in the electric power supply system 1 of the present embodiment, by combining the power-type battery (the nickel-hydrogen secondary battery) and the energy-type battery (the lithium-ion secondary battery), it is possible to make each battery perform its best output (a high output/long-term output). As a result, it is possible to provide the electric power supply system 1 having a high output and a high capacity at a lower cost than an electric power supply system of an energy-type battery only or a power-type battery only.

In the present embodiment, the alternating current sweep unit 3 outputs alternating current (three-phase alternating current) by Y-connecting the battery strings St. Since no inverter is used, the cost can be reduced.

In the present embodiment, in the alternating current electric power supply circuit 2, the first direct current sweep unit 10, the second direct current sweep unit 20, and the third direct current sweep unit 30 are connected in parallel. The first to third direct current sweep units 10 to 30 correspond to the "direct current sweep units" of the present disclosure, and the battery strings St1 to St3 correspond to the "direct current battery strings" of the present disclosure. In the present embodiment, three direct current sweep units are connected in parallel, but the number of direct current sweep units may be one or four, or more.

In the present embodiment, in the alternating current sweep unit 3, the battery strings St4, St5 are used as the U-phase battery strings, the battery strings St6, St7 are used as the V-phase battery strings, and the battery strings St8 and St9 are used as the W-phase battery strings. The number of the U-phase battery strings, the V-phase battery strings, or the W-phase battery strings may be one or three, or more.

In the present embodiment, ternary system (NMC) lithium-ion secondary batteries are used for the batteries B of the battery strings St4, St6, St8 and iron phosphate-based (LFP) lithium-ion secondary batteries are used for the batteries B of the battery strings St5, St7, St9. However, the type of lithium-ion secondary battery of each battery string St is arbitrary and types of lithium-ion secondary batteries may be mixed.

The embodiment disclosed herein needs to be considered as illustrative in all points and not restrictive. The scope of the present disclosure is shown not by the above description of the embodiments but by the claims, and is intended to include meanings equivalent to the claims and all modifications within the scope thereof.

What is claimed is:

1. An electric power supply system comprising:
    an alternating current sweep unit configured to output alternating current electric power from a U-phase battery string, a V-phase battery string, and a W-phase battery string that are Y-connected;
    an alternating current electric power supply circuit configured to convert an output of a direct current sweep unit including a direct current battery string into alternating current electric power using an inverter and output the alternating current electric power; and
    a control device configured to control the alternating current sweep unit and the alternating current electric power supply circuit, wherein:
    each of the U-phase battery string, the V-phase battery string, the W-phase battery string, and the direct current battery string includes a plurality of battery circuit modules connected in series;
    each of the battery circuit modules includes a battery, an output terminal that outputs voltage of the battery, a first switch connected to the output terminal and connected in parallel to the battery, and a second switch connected in series to the battery;
    each of the battery circuit modules is configured such that the voltage of the battery is applied to the output terminal when the first switch is in an OFF state and the second switch is in an ON state;
    output densities of the batteries included in the direct current battery string are higher than output densities of the batteries included in the U-phase battery string, the V-phase battery string, and the W-phase battery string;
    the alternating current electric power supply circuit and the alternating current sweep unit are electrically connectable to an external electric power supply; and
    the control device is configured to:
        control the alternating current sweep unit and the alternating current electric power supply circuit such that electric power adjustment of the external electric power supply is performed by input and output electric power of the alternating current sweep unit and the alternating current electric power supply circuit, and
        control the alternating current sweep unit and the alternating current electric power supply circuit such that when an output of alternating current electric power is requested for the electric power adjustment, alternating current electric power is output from the alternating current sweep unit and the alternating current electric power supply circuit, and after a first predetermined period elapses, the output of the alternating current electric power from the alternating current electric power supply circuit is stopped and the alternating current electric power is output from the alternating current sweep unit.

2. The electric power supply system according to claim 1, wherein the control device is configured to control the alternating current sweep unit and the alternating current electric power supply circuit such that when electric power consumption of the external electric power supply is requested as the electric power adjustment, charging of the batteries included in the alternating current sweep unit and the alternating current electric power supply circuit is performed, and after a second predetermined period elapses, charging of the batteries is performed according to states of charge of the batteries.

3. The electric power supply system according to claim 1, wherein the control device is configured to set the first predetermined period based on at least one of temperatures of the batteries included in the direct current battery string and states of charge of the batteries included in the direct current battery string.

4. The electric power supply system according to any one of claim 1, wherein energy densities of the batteries included in the U-phase battery string, the V-phase battery string, and the W-phase battery string are higher than energy densities of the batteries included in the direct current battery string.

5. The electric power supply system according to claim 1, wherein:
- the batteries included in the direct current battery string are nickel-hydrogen batteries; and
- the batteries included in the U-phase battery string, the V-phase battery string, and the W-phase battery string are lithium-ion batteries.

\* \* \* \* \*